United States Patent
Katsuya et al.

(10) Patent No.: US 8,023,787 B2
(45) Date of Patent: Sep. 20, 2011

(54) CICADA-RESISTANT OPTICAL DROP CABLE

(75) Inventors: Toshiaki Katsuya, Higashiosaka (JP);
Masaji Asano, Higashiosaka (JP);
Kiyotaka Urashita, Higashiosaka (JP);
Daisuke Yoshimura, Higashiosaka (JP)

(73) Assignee: Tatsuta Electric Wire & Cable Co., Ltd., Osaka (JP)

( * ) Notice: Subject to any disclaimer, the term of this patent is extended or adjusted under 35 U.S.C. 154(b) by 175 days.

(21) Appl. No.: 12/516,392

(22) PCT Filed: Nov. 20, 2007

(86) PCT No.: PCT/JP2007/072428
§ 371 (c)(1),
(2), (4) Date: May 27, 2009

(87) PCT Pub. No.: WO2008/065928
PCT Pub. Date: Jun. 5, 2008

(65) Prior Publication Data
US 2010/0086269 A1  Apr. 8, 2010

(30) Foreign Application Priority Data
Nov. 27, 2006  (JP) ................................. 2006-318845
Mar. 23, 2007  (JP) ................................. 2007-076824

(51) Int. Cl.
*G02B 6/44* (2006.01)

(52) U.S. Cl. ......... 385/102; 385/100; 385/109; 385/113

(58) Field of Classification Search ........................ None
See application file for complete search history.

(56) References Cited

U.S. PATENT DOCUMENTS

| 4,960,849 A | | 10/1990 | Okabe et al. | |
|---|---|---|---|---|
| 6,204,445 B1 | * | 3/2001 | Gialenios et al. | 174/40 R |
| 6,421,486 B1 | * | 7/2002 | Daneshvar et al. | 385/109 |
| 6,728,455 B2 | * | 4/2004 | Kusakari et al. | 385/113 |
| 2004/0222009 A1 | * | 11/2004 | Blew et al. | 174/110 F |
| 2005/0238299 A1 | * | 10/2005 | Takahashi | 385/100 |

FOREIGN PATENT DOCUMENTS

| JP | 63-235320 | 9/1988 |
|---|---|---|
| JP | 2002-090593 | 3/2002 |
| JP | 2002-328276 | 11/2002 |
| JP | 2006-065288 | 3/2006 |

OTHER PUBLICATIONS

International Search Report issued Dec. 18, 2007 in the International (PCT) Application of which the present application is the U.S. National Stage.

* cited by examiner

*Primary Examiner* — Tina Wong
(74) *Attorney, Agent, or Firm* — Wenderoth, Lind & Ponack, L.L.P.

(57) ABSTRACT

An optical drop cable includes optical fiber cores, tension-resistant members, and a single-material outer sheath covering the cores and the tension-resistant members. The bark of a young tree has elasticity, so that if cicadas lay eggs in the bark, the holes in which eggs are laid close and the eggs will not hatch. Cicadas cannot stick their ovipositors into bark having abrasion resistance. Thus, the outer sheath is made of polyurethane resin having rebound resilience equivalent to that of the bark of a young tree, and having high abrasion resistance. By making the outer sheath from such resin having elasticity and abrasion resistance, holes in which eggs are laid close, thus making hatching of the eggs impossible, or cicadas cannot stick their ovipositors into the outer sheaths. Black cicadas will therefore not lay eggs in the outer sheath, preventing damage to or breakage of the optical fiber.

9 Claims, 6 Drawing Sheets

Scar by tack
Flame-retardant polyethylene
Front

Scar by tack
Flame-retardant polyethylene
Back

Flame-retardant low-friction polyurethane
Front

Flame-retardant low-friction polyurethane
Back

Dead tree    Front

Live tree    Back

Needle 1 mm diameter

Tack 0.9 mm diameter

CICADA-RESISTANT OPTICAL DROP CABLE

TECHNICAL FIELD

This invention relates to an outdoor optical drop cable which can prevent ovipositors of cicadas such as black cicadas (*Cryptotympana facialis*) from being stuck therein, thereby preventing damage thereto.

BACKGROUND ART

Figure 9:
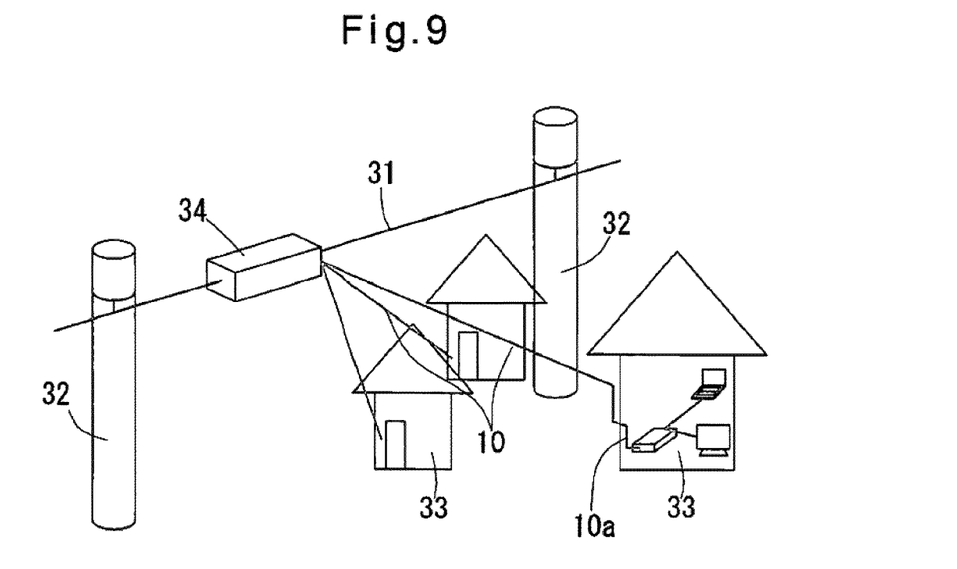
FIG. 9 shows how optical drop cables are installed.

As shown in FIG. 9, optical drop cables 10 are typically used to connect an outdoor optical cable feeder 31 stretched between power poles to individual houses 33 through an optical closure 34. As shown in FIGS. 1 to 4, optical drop cables 10 typically comprise optical fiber cores 11 and tension (resistant) members 12 provided on both sides of the cores 11 which are covered by resin together with a support wire (suspension wire) 13 (see JP Patent Publications 2002-090593A and 2002-328276A).

As shown in FIG. 9, because such optical cables 10 are used outdoors, cicadas (and other insects) fly to them. Some cicadas deposit eggs directly in bark by sticking their ovipositors into the bark. Others form bite marks in the bark and deposit eggs in the bark through the bite marks.

Among such cicadas, black cicadas have especially strong ovipositors. Thus, if eggs are deposited by black cicadas in the outer sheath 15 of an optical drop cable 10, which is made of resin, their ovipositors frequently damage or entirely break the optical fiber cores (element wires) 11 when the ovipositors are stuck into the outer sheath 15.

In order to prevent the ovipositors of black cicadas from getting stuck in optical drop cables, JP Patent Publications 2002-090593A and 2002-328276A propose to improve notches 14, through which ovipositors are likely to get stuck in the cable.

JP Patent Publication 2006-65288A proposes to provide an outer sheath 15 having a circular outer sectional shape so that black cicadas cannot easily land on the cable.

In particular, in JP Patent Publications 2002-090593A and 2002-328276A, the apex of each notch 14 is oriented so as not to face the optical fiber cores 11, thereby preventing ovipositors from getting stuck into the cable toward their optical fiber cores 11.

But every cicada does not necessarily stick its ovipositor in a direction away from the optical fiber cores 11 (and toward the apex of the notch 14). Some cicadas may stick their ovipositors toward the optical fiber cores 1. In such a case, the optical fiber cores 11 may be damaged or broken.

The arrangement of JP Patent Publication 2006-65288A is effective to a certain extent. But it was discovered that ovipositors were stuck in the outer sheaths 15 of some of such cables. Thus, this arrangement cannot sufficiently prevent ovipositors from getting stuck in optical drop cables.

SUMMARY OF THE INVENTION

An object of the present invention is to reliably prevent ovipositors of cicadas such as black cicadas from getting stuck into optical drop cables.

Figure 10:
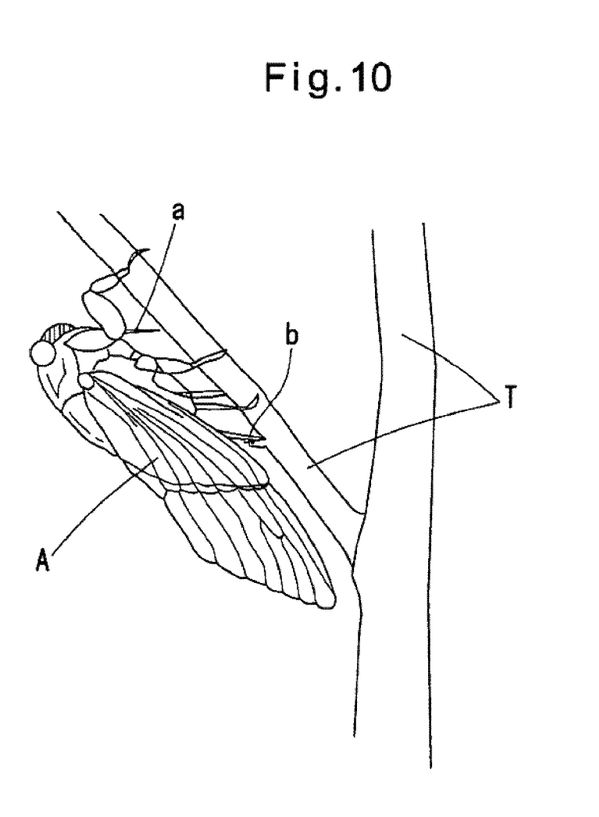
FIG. 10 shows how a black cicada lay eggs.

The inventors observed how cicadas and particularly black cicadas lay eggs, and discovered that as shown in FIG. 10(*a*), when laying eggs in a tree T, a black cicada A determines whether or not the tree T is suitable as a place for laying eggs based on feel to hair sensilla at its belly and with its snout a (by tentatively sticking its ovipositor), and if the tree T is determined to be a suitable place to lay eggs, it sticks the ovipositor b and lays eggs.

The ovipositor b is a tube-like member (5.5 to 11.5 mm long and 0.4 to 0.9 mm in diameter) comprising a central piece b1 in the shape of a pointed gimlet and side pieces $b_2$ provided on both sides of the central piece b1 and fitted on the central piece $b_1$ so as to cover the central piece $b_2$. By alternately bringing serrations (having a diameter of 0.8 to 1.1 mm) at the tips of the respective side pieces $b_2$ into frictional contact with the tree, a deep hole is formed in the tree in the same manner as a hole is formed with a gimlet, and eggs are laid in the hole.

Cicadas laid eggs mostly in dead trees T, and never laid eggs in live trees whose sap cicadas like to suck, such as trees full of green leaves or young trees rich in water.

Figures 6A, 6B:
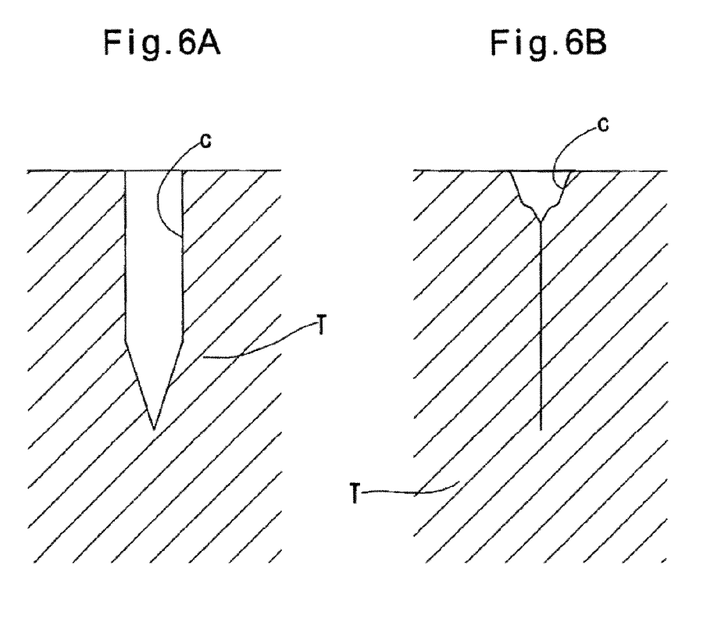
FIG. 6 shows scars on a dead tree and a live tree.

In order to find out the reason why cicadas prefer dead trees to live trees, tacks (0.9 mm in needle diameter; see FIG. 7) were pushed into the respective trees to the depth of about 5 mm to form holes c in the dead tree and live tree, and then, the diameters and the appearance of the holes c were observed. The results of the observation are shown in Table 1. FIGS. 6(*a*) and 6(*b*) show the sectional views of the holes c formed in the dead tree and the live tree, respectively.

Tacks having a needle diameter of 0.9 mm were pushed into the trees to the depth of 5 mm, because the ovipositors of black cicadas typically have a diameter of about 0.9 mm and are stuck into trees to the depth of about 0.5 mm.

The above-mentioned (and also below-mentioned) holes were observed under a microscope, and their diameters were measured in the X-axis and Y-axis directions using a digital micrometer attached to the microscope.

TABLE 1

| | | Scar diameter on surface (mm) | X-axis diameter (mm) | Y-axis diameter (mm) | Average diameter (mm) | n3 average diameter (mm) | Remark |
|---|---|---|---|---|---|---|---|
| Dead tree | n1 | 0.935 | 0.928 | 0.932 | 0.969 | | Hole not closed |
| | n2 | 1.014 | 1.101 | 1.058 | | | |
| | n3 | 0.874 | 0.962 | 0.918 | | | |
| Live tree | n1 | 0.895 | 0.899 | 0.897 | 0.921 | | Hole closed |
| | n2 | 0.928 | 0.920 | 0.924 | | | |
| | n3 | 0.950 | 0.933 | 0.942 | | | |

As is apparent from Table 1 and FIG. 6, the hole in the dead tree is larger in diameter at its surface portion than that of the hole formed in the live tree. Also, while the hole c in the live tree was mostly closed, the hole c in the dead tree was scarcely closed. This fact is also apparent from the photos of FIG. 7 titled "hole formed by a tack in dead tree; its surface" and "hole formed by a tack in live tree; its surface".

From this fact, it is apparent that if a cicada lays eggs in a hole formed in the bark of a young tree T, the hole closes as the tree grows, making hatching of the eggs impossible. Also, because the bark of a young tree T has elasticity, when the ovipositor is pulled out of the bark after laying eggs, the eggs may be trapped in the hole (just like a hole formed in a tubeless wheel tire by a nail is closed when the nail is pulled out of the tire), thus similarly making hatching of the eggs impossible.

It is considered that black cicadas instinctively know this fact, and avoid laying eggs in young trees T.

The present invention was made based on these findings, and in order to solve the above-mentioned problems, the present invention provides an optical drop cable including an outer sheath 15 made of a resin having such high rebound resilience that when the ovipositor of a cicada such as a black cicada is pulled out of the outer sheath 15, the hole formed by the ovipositor is closed by the resilience of the outer sheath.

In an experiment conducted to confirm the theory that "cicadas will not stick their ovipositors into the outer sheath if the outer sheath has sufficiently high rebound resilience", it was discovered that some cicadas stick their ovipositors b without determining whether or not the outer sheath is a suitable place for laying eggs based on feel to hair sensilla at its belly and with its snout a. In this case, it was confirmed that if the serration-shaped side pieces $b_2$ of the ovipositor b cannot be stuck into the outer sheath, cicadas gave up laying eggs in the drop cable. The inventors thought that this was because the surface of the outer sheath that shows high strength (resistance to scratches and carving) which makes it difficult to stick ovipositors b was sufficiently abrasion-resistant.

The present invention was made based on this thought. In order to solve the above-mentioned problem, according to the present invention, the outer sheath 15 is made of a resin having sufficient abrasion resistance to prevent ovipositors from getting stuck therein.

By making the outer sheath 15 from a resin having high rebound resilience or an abrasion-resistant resin, as will be apparent from the below-identified experiment examples, black cicadas and other cicadas practically never laid eggs in the optical drop cable.

The rebound resilience of the resin is measured in terms of the ratio $T_1/T_0$, where $T_0$ is the height from which an object made of the resin is dropped, and $T_1$ is the height to which the object rebounds. For example, the resin has a rebound resilience of 30 to 80% under JIS K7311, and has an abrasion resistance of not more than 0.25 mm after being rotated 1000 times while being abraded, and not more than 0.35 mm after being rotated 2000 times while being abraded, under JIS C3005.

The range of the rebound resilience of 30 to 80% under JIS K7311 is an ordinary range of the rubber resilience. If this value is less than 30%, the resin tends to show plasticity, which means that the resin tends to be easily deformed and never returns or is slow to return to the original state. On the other hand, if this value exceeds 80%, the resin tends to be hard. Thus, within the above range, i.e. the ordinary range of the rubber resilience, it is considered that ovipositors will not be stuck therein in view of the results of the below experiments.

If the abrasion resistance exceeds 0.25 mm after being rotated 1000 times while being abraded, or 0.35 mm after being rotated 2000 times while being abraded, under JIS C3005, the surface of the outer sheath of the cable tends to be damaged, and also ovipositors (i.e. their serration-shaped side pieces $b_2$) may be stuck in the outer sheath.

In one arrangement of the present invention, in an outdoor optical cable having an outer sheath made of a single material and covering the optical fiber cores and tension-resistant members, the outer sheath is made of a resin having one or both of such rebound resilience and abrasion resistance that ovipositors of cicadas such as black cicadas cannot be stuck therein.

The present invention is limited to "outdoor" optical drop cables, because cicadas lay in outdoor cables only, and not in indoor cables.

The resin forming the outer sheath is limited to a resin "having one or both of such rebound resilience and abrasion resistance that ovipositors of cicadas such as black cicadas cannot be stuck therein". This is because while it is preferable that the resin have both of "such rebound resilience and abrasion resistance that ovipositors of cicadas such as black cicadas cannot be stuck therein", there are cases where ovipositors of cicadas such as black cicadas are not stuck into the outer sheath even if the resin has only one of the above-defined rebound resilience and abrasion resistance.

Resins used for the outer sheath include thermoplastic elastomers because thermoplastic elastomers can easily achieve the above-defined rebound resilience and abrasion resistance. From among them such as from among urethane, olefin, styrene, ester and vinyl chloride thermoplastic elastomers, a suitable one is selected, by experiments, that satisfies the required rebound resilience and abrasion resistance. These thermoplastic elastomers are elastic rubber members that melt by heating and solidify by cooling, and thus have intermediate physical properties between vulcanized rubber and plastics. Accordingly, these elastomers have high rebound resilience and high abrasion resistance.

Indoor cables are known which include an outer sheath made of a thermoplastic elastomer. But the outer sheaths of these cables are made of a thermoplastic elastomer not for the purpose of preventing cicadas from laying eggs therein.

Preferably, the outer sheath is made of a thermoplastic elastomer having urethane bonds in the hard segment of the molecular structure because such an elastomer has especially high mechanical strength and abrasion resistance.

Further preferably, the outer sheath is made of a thermoplastic elastomer having ether bonds in the soft segment of the molecular structure, and containing ultraviolet absorbers such as carbon black in order to improve the weather resistance. Ether is resistant to hydrolysis. Ultraviolet absorbers ensure resistance to ultraviolet light. Because the optical drop cable according to the present invention is used outdoors, high weather resistance is an advantage.

Also preferably, a lubricant is added to the thermoplastic elastomer in order to improve the slidability of the surface of the outer sheath, thus causing the serration-shaped side pieces $b_2$ of ovipositors b to slip and making it impossible to stick them into the outer sheath. Also, the addition of a lubricant will make it easier to pass the drop cable through narrow spaces when laying the cable.

Also, a polyolefin resin may be added to the thermoplastic elastomer to improve extrusion properties.

The above-described resins such as the above-mentioned thermoplastic elastomer preferably have a rebound resilience of 30 to 80% under JIS K7311, and an abrasion resistance of not more than 0.25 mm after being rotated 1000 times while being abraded, and not more than 0.35 mm after being rotated 2000 times while being abraded, under JIS C3005, and more preferably not more than 0.15 mm after being rotated 1000 times while being abraded, and not more than 0.20 mm after being rotated 2000 times while being abraded, under JIS C3005.

A urethane thermoplastic elastomer has a rebound resilience of 30 to 70% under JIS K7311, and an abrasion resistance of not more than 0.15 mm after being rotated 1000 times while being abraded, and not more than 0.20 mm after being rotated 2000 times while being abraded, under JIS C3005.

In order to confirm that when the outer sheath is made of polyurethane, which is a thermoplastic elastomer, holes formed by sticking ovipositors are closed by the elasticity of the resin, comparison tests were conducted between flame-retardant polyurethane and flame-retardant low-friction polyurethane. The results of the test are shown in Tables 2 to 4.

Figure 7:
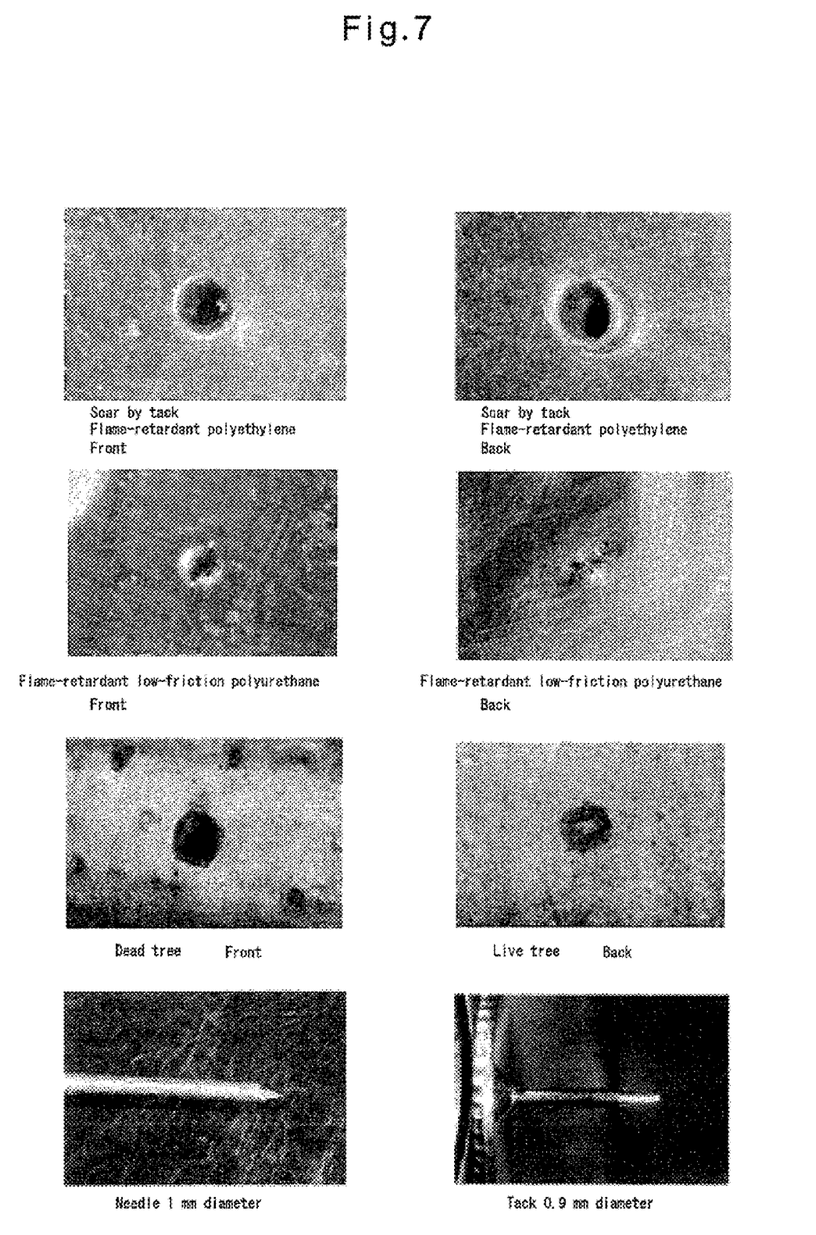
FIG. 7 shows scars on flame-retardant polyethylene and flame-retardant low-friction polyurethane formed by sticking a tack, and partial front views of the tack and a needle.
Figure 8:
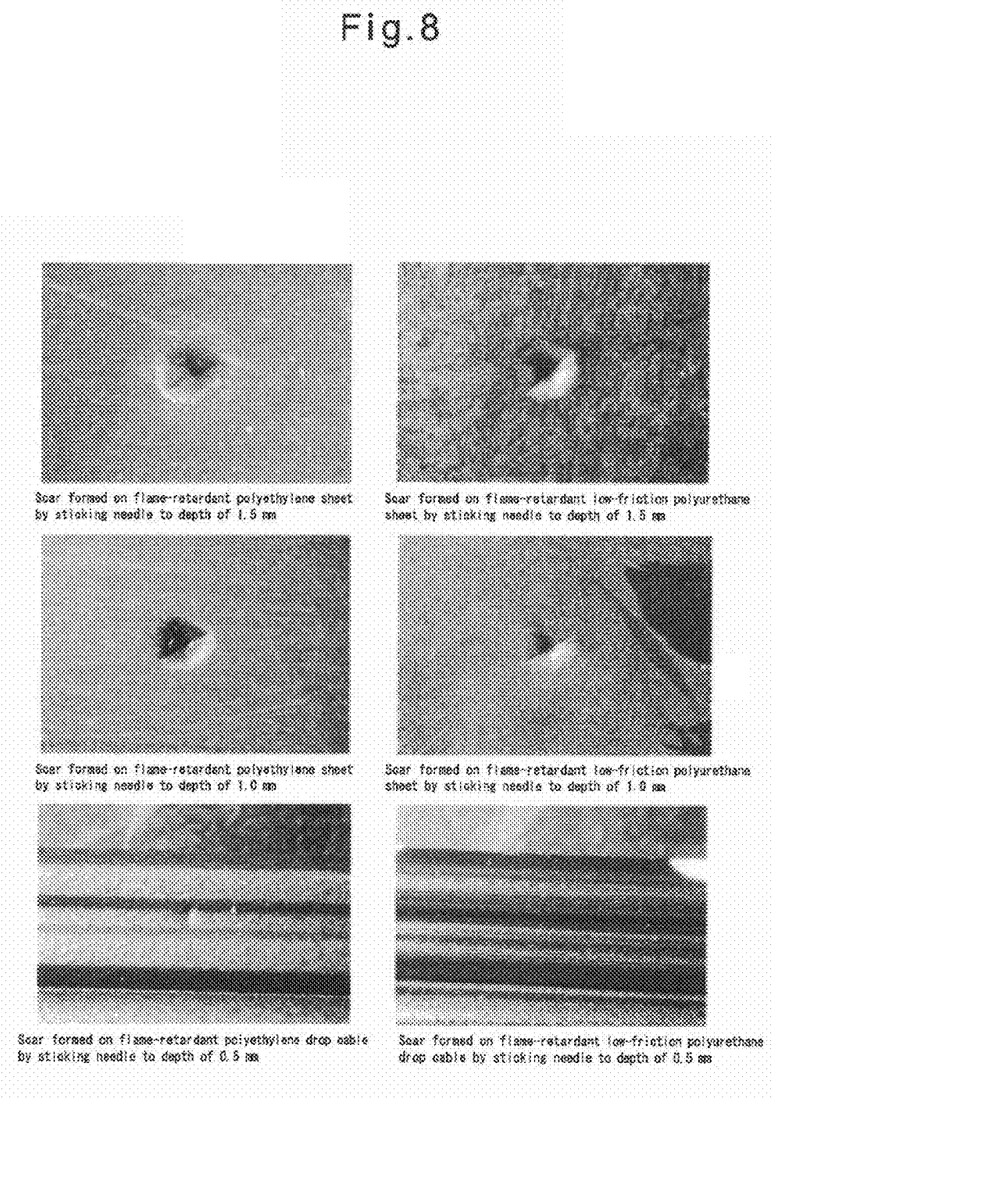
FIG. 8 shows scars on flame-retardant polyethylene and flame-retardant low-friction polyurethane formed by sticking the needle.

Tables 2 and 3 show the results of a test in which the above-mentioned tacks (having a needle diameter of 0.9 mm) were stuck into a flame-retardant polyethylene sheet, and a flame-retardant low-friction polyurethane sheet, both 2 mm thick. Table 2 shows the diameters of scars on the surfaces of the respective sheets. Table 3 shows the diameters of holes formed in the sheets. Table 4 shows the diameters of scars formed on the surfaces of a flame-retardant polyethylene sheet, and a flame-retardant low-friction polyurethane sheet, both 2 mm thick, when needles 1 mm in diameter were stuck in the respective sheets (see FIG. 7). FIG. 7 shows the front and back of the flame-retardant polyethylene sheet and the flame-retardant low-friction polyurethane sheet into which the tacks were stuck. FIG. 8 shows the front of the respective sheets in which the needles are stuck.

As shown in Table 3, the diameters of the holes formed in the flame-retardant polyethylene sheet were about 0.7 mm. On the other hand, all the holes in the flame-retardant low-friction polyurethane sheet were closed.

As is apparent from Table 4, the diameters of the scars formed in the flame-retardant low-friction polyurethane sheet were about 57% of, and thus about 43% smaller than, the diameters of the scars formed in the flame-retardant polyethylene sheet, both when the needles were stuck into the sheets to the depth of 1.5 mm and 1.0 mm.

TABLE 2

| Scar diameter on surface | | X-axis diameter (mm) | Y-axis diameter (mm) | Average diameter (mm) | n1-n3 average diameter (mm) | Ratio of scar diameters (Flame-retardant low-friction polyurethane/ Flame-retardant polyethylene) | Remark |
|---|---|---|---|---|---|---|---|
| Flame-retardant polyethylene | n1 | 1.004 | 0.933 | 0.969 | 1.093 | 61% | Hole remains open |
| | n2 | 1.167 | 1.155 | 1.161 | | | |
| | n3 | 1.176 | 1.123 | 1.150 | | | |
| Flame-retardant low-friction polyurethane | n1 | 0.678 | 0.703 | 0.691 | 0.667 | | Hole closed |
| | n2 | 0.668 | 0.605 | 0.637 | | | |
| | n3 | 0.673 | 0.674 | 0.674 | | | |

TABLE 3

| | Hole diameter | X-axis diameter (mm) | Y-axis diameter (mm) | Average diameter (mm) | n1-n3 average diameter (mm) |
|---|---|---|---|---|---|
| Flame-retardant polyethylene | n1 | 0.604 | 0.430 | 0.517 | 0.681 |
| | n2 | 0.881 | 0.657 | 0.769 | |
| | n3 | 0.764 | 0.750 | 0.757 | |

From the above results, it is apparent that, unlike a flame-retardant polyethylene sheet, even if the ovipositor of a cicada such as a black cicada is stuck into the flame-retardant low-friction polyurethane, as soon as the ovipositor is pulled out, the hole formed by the ovipositor closes. In order to confirm whether this happens with actual optical drop cables too, needles 1 mm in diameter were perpendicularly stuck into notches 14 of two optical drop cables 10 of the type shown in FIG. 1, one having an outer sheath 15 made of flame-retardant polyethylene, and the other made of flame-retardant low-friction polyurethane, to the depth of 0.5 mm. The diameters

TABLE 4

| | | Scar diameter on surface | | X-axis diameter (mm) | Y-axis diameter (mm) | Average diameter (mm) | n1-n3 average diameter (mm) | Ratio of scar diameters (Flame-retardant low-friction polyurethane/ Flame-retardant polyethylene) |
|---|---|---|---|---|---|---|---|---|
| 1.5 mm depth | Flame-retardant polyethylene | | n1 | 0.887 | 0.939 | 0.913 | 0.881 | 58% |
| | | | n2 | 0.815 | 0.893 | 0.854 | | |
| | | | n3 | 0.860 | 0.889 | 0.875 | | |
| | Flame-retardant low-friction polyurethane | | n1 | 0.462 | 0.547 | 0.505 | 0.509 | |
| | | | n2 | 0.460 | 0.478 | 0.469 | | |
| | | | n3 | 0.513 | 0.592 | 0.553 | | |
| 1.0 mm depth | Flame-retardant polyethylene | | n1 | 0.690 | 0.735 | 0.713 | 0.692 | 56% |
| | | | n2 | 0.635 | 0.690 | 0.663 | | |
| | | | n3 | 0.685 | 0.715 | 0.700 | | |
| | Flame-retardant low-friction polyurethane | | n1 | 0.365 | 0.336 | 0.351 | 0.385 | |
| | | | n2 | 0.403 | 0.306 | 0.355 | | |
| | | | n3 | 0.434 | 0.467 | 0.451 | | |

As is apparent from Table 2, the diameters of the scars on the flame-retardant low-friction polyurethane sheet are about 61% of, and thus about 39% smaller than, the diameters of the scars on the flame-retardant polyethylene sheet. Some scars formed on the flame-retardant sheet are larger than the tack diameter, i.e. 9 mm. This is because the hand of a person who sticks the tacks shakes.

of the holes thus formed were measured, and their outer appearances were observed. The results of measurement and observation are shown in Table 5 and FIG. 8.

From these results, it is apparent that the outer sheath made of flame-retardant low-friction polyurethane can prevent cicadas from laying eggs more effectively than the outer sheath made of frame-retardant polyethylene.

TABLE 5

| Drop | | Scar diameter on surface | X-axis diameter (mm) | Y-axis diameter (mm) | Average diameter (mm) | n3 average diameter (mm) | Remark |
|---|---|---|---|---|---|---|---|
| 0.5 mm depth | Flame-retardant polyethylene | n1 | 0.332 | 0.304 | 0.318 | 0.319 | Hole found |
| | | n2 | 0.309 | 0.280 | 0.295 | | |
| | | n3 | 0.357 | 0.332 | 0.345 | | |
| | Flame-retardant low-friction polyurethane | n1 | 0.000 | 0.000 | 0.000 | 0.000 | No scar |
| | | n2 | 0.000 | 0.000 | 0.000 | | |
| | | n3 | 0.000 | 0.000 | 0.000 | | |

The resin forming the outer sheath preferably has a tensile strength of 10 to 50 MPa under JIS K7311, and an elongation of not more than 1200% under JIS K7311.

If the tensile strength is less than 10 MPa, the outer sheath tends to rupture when the cable is pulled. If the tensile strength is higher than 50 MPa, the outer sheath tends to be too hard, less flexible and may lose rubber elasticity.

If the elongation is higher than 1200%, the outer sheath is too soft and its rubber elasticity is low, which makes it difficult to achieve the rebound resilience of 30 to 80% under JIS K7311.

Urethane thermoplastic elastomers have a tensile strength of 20 to 50 MPa and an elongation of 300 to 800%.

With the arrangement of the present invention, as detailed above, it is possible to prevent damage to or breakage of the optical drop cable due to the cable being stuck with ovipositors of cicadas such as black cicadas.

DETAILED DESCRIPTION OF THE INVENTION

FIGS. 1 to 4 show sectional views of optical drop cables 10 to which the concept of the present invention is applied. Any of the drop cables shown in these figures comprises optical fiber core 0.25 mm in outer diameter, tension members 12 comprising aramid fiber-reinforced plastic strings 0.45 mm in diameter, a zinc-plated steel wire (support wire) 13 having a diameter of 1.2 mm, a protective outer sheath 15 covering and protecting the optical fiber cores 11 and the tension members 12 and made of a resin, and a protective outer sheath 16 covering and protecting the zinc-plated steel wire and made of the same resin forming the outer sheath 15. Notches 14 are formed in the outer sheath 15. The cable body (optical fiber cores 11) is connected to the support wire 13 through a bridge 17. A small gap G exists around the optical fiber cores.

Figure 1:
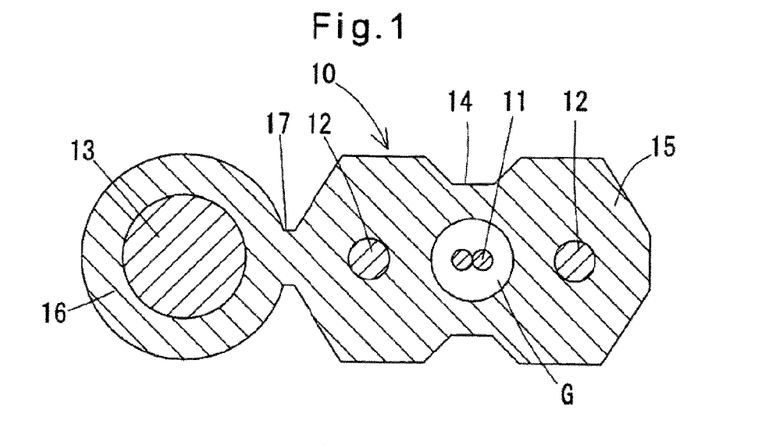
FIG. 1 is a sectional view of one embodiment.

The optical drop cable 10 of FIG. 1 has a polygonal cross-section, having a lateral (in the respective figures) width of about 5.5 mm, a vertical (in the respective figures) width of about 2.0 mm. The optical drop cable 10 of FIG. 2 has a substantially track-shaped cross-section, having a lateral width of about 5.5 mm and a vertical width of about 2.0 mm. The optical drop cable 10 of FIG. 3 has an oval cross-section, having a lateral width of about 5.5 mm and a vertical width of about 2.0 mm. The optical drop cable 10 of FIG. 4 has an oval cross-section, having a lateral width of about 4.8 mm and a vertical width of about 2.2 mm.

Examples 1 to 4 of the invention and Comparative Example 1 were prepared and had structures of the respective figures as shown in FIG. 7, and of which the outer sheaths 15 and 16 had resin properties shown in Table 6. The outer sheaths of Examples 1 to 4 of the invention comprise 60% by weight of a polyether-based thermoplastic polyurethane elastomer, 30% by weight of an olefin resin as a polymer blend resin, and 8% by weight of a flame retardant, the balance being carbon black as an ultraviolet absorber and other components. Except for Example 4 of the invention, the sheaths 15 and 16 further contain a lubricant.

In Table 6, "retention" refers to the rate (%) of the respective physical property values after the resin has been subjected to (accelerated) aging under the respective conditions, relative to their respective initial values before aging. Thus, the retention rates indicate to what degree the initial physical properties are retained after aging under the respective conditions. In other words, the retention rates are indexes of long-term reliability of material. The "deformation rate by heating" is given by $(T_0-T_i)/T_0 \times 100$, where $T_0$ is the thickness of each specimen before heating, and $T_i$ is the thickness of each specimen after heating at 75±2° C. for 30 minutes, and then applying a load of 9.8 N for 30 minutes. This value thus indicates the physical properties at high temperature. The symbol "-" in the Comparative Example indicate that no measurement was made because the material used in the Comparative Example is known to be sufficiently reliable.

TABLE 6

| | | | | Example of the invention | | Comparative example |
|---|---|---|---|---|---|---|
| | | | | Target value | Measured data | Measured data |
| Material | Tensile property | Normal temperature (initial value) | Tensile strength | 20 MPa or higher | 27.0 MPa | 12.7 MPa |
| | | | Elongation | 350% or higher | 465% | 710% |

TABLE 6-continued

|  |  |  |  | Example of the invention | | Comparative example |
|---|---|---|---|---|---|---|
|  |  |  |  | Target value | Measured data | Measured data |
|  |  | Heat deterioration (100° C. × 48 h) | Tensile strength Elongation | 75% or higher | 93% 100% | — — |
|  |  | Hydrolytic resistance (60° C. warm water × 30 days) | Tensile strength Elongation |  | 93% 100% | — — |
|  |  | Weather resistance | 2000 h Tensile strength Elongation |  | 96% 102% | — — |
|  |  |  | 4000 h Tensile strength Elongation |  | 88% 108% | — — |
|  |  | Deformation rate by heating |  | Not more than 20% | 1.10% | 1.90% |
|  |  | Cold resistance |  | No crack at −30° C. | Crack at −60° C. | (−30° C. or higher) |
| Cable | Abrasion resistance (Thickness reduction after JIS C3005, 1000 rotations) | Normal temperature (initial value) Weather 2000 h resistance 4000 h |  | No more than 0.25 mm | 0.10 mm 0.10 mm 0.10 mm | 0.48 mm — — |
|  | Abrasion resistance (Thickness reduction after JIS C3005, 2000 rotations) | Normal temperature (initial value) Weather 2000 h resistance 4000 h |  | No more than 0.35 mm | 0.17 mm 0.17 mm 0.17 mm | 0.65 mm — — |
|  | Coefficient of dynamic friction of cable (pulling force/load) | Normal temperature (initial value) Weather 2000 h resistance 4000 h |  | No more than 0.45 | 0.25 0.39 0.40 | 1.42 — — |

TABLE 7

Figure 2:
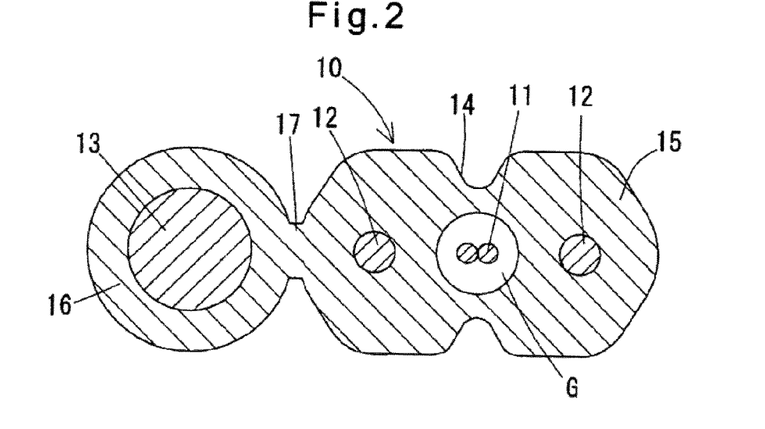
FIG. 2 is a sectional view of another embodiment.
Figure 3:
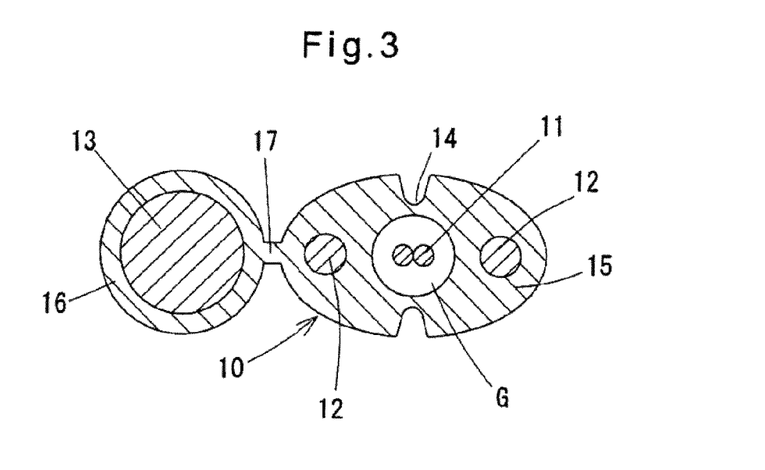
FIG. 3 is a sectional view of still another embodiment.
Figure 4:
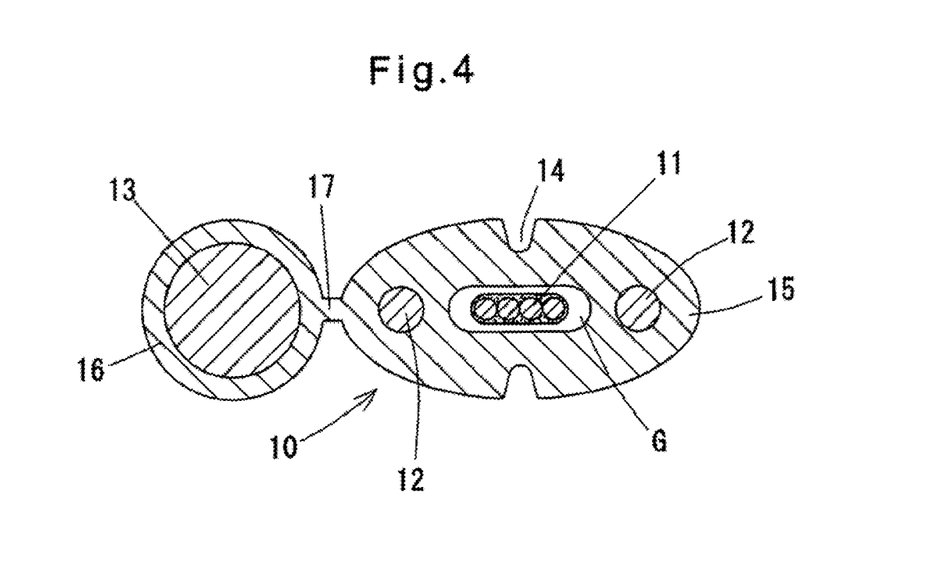
FIG. 4 is sectional view of yet another embodiment.

|  | Material of outer sheaths 15, 16 | Structure diagram |
|---|---|---|
| Comparative Example 1 | Flame-retardant polyethylene | FIG. 1 |
| Example 1 of invention | Flame-retardant low-frictional polyurethane | FIG. 2 |
| Example 2 of invention | Flame-retardant low-frictional polyurethane | FIG. 3 |
| Example 3 of invention | Flame-retardant low-frictional polyurethane | FIG. 4 |
| Example 4 of invention | Flame-retardant polyurethane (no lubricant) | FIG. 2 |

Figure 5A:
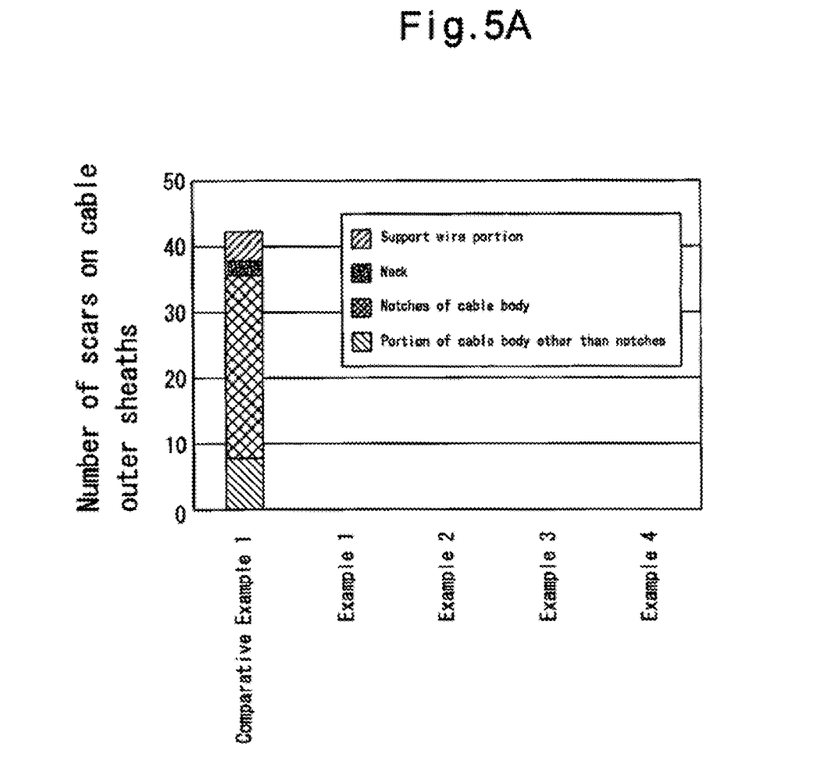
FIG. 5 shows scars on examples of the invention and comparative examples.

Cables each 2 to 4 m long according to each of Comparative Example 1 and Examples 1 to 4 of the invention were arranged circumferentially on the outer surface of a tree at intervals of about 3 cm in the pattern of a roller screen (roller screen test). The test was conducted during the period from Jul. 24, 2006 to Sep. 4, 2006. Table 8 shows the results of the test (number of points stuck). FIG. 5(a) shows the breakdown of the scars on the outer sheaths 15 and 16 caused by ovipositors b of black cicadas A. The numbers in brackets ( ) in Table 7 are the numbers of cable specimens that suffered scars. Scars on the outer sheaths 15 and 16 were counted by visually observing the outer sheaths 15 and 16. Then, the cables 10 were dismantled and the scars were counted first by visually observing the outer sheaths 15 and 16 to count scars on the sheaths 15 and 16, and then the respective cable specimens 10 were dismantled, and the scars on the optical fiber cores 11 were counted by visually observing the cores, touching the cores with hands and observing the cores under a microscope.

As will be apparent from the test results, no scars resulting from ovipositors of black cicadas were found on the sheaths 15 and 16 of the cables according to any of the examples according to the present invention, while many scars were found on Comparative Example 1.

TABLE 8

|  | Comparative example 1 | Example 1 of invention | Example 2 of invention | Example 3 of invention | Example 4 of invention |
|---|---|---|---|---|---|
| Number of specimens | 33 | 33 | 33 | 33 | 33 |
| Outer sheath 16 | 5 (3) | 0 | 0 | 0 | 0 |
| Bridge 17 (number of specimens) | 2 (2) | 0 | 0 | 0 | 0 |
| Notches | 27 (5) | 0 | 0 | 0 | 0 |
| Outer sheath 15 other than notches | 8 (5) | 0 | 0 | 0 | 0 |
| Total | 42 (9) | 0 | 0 | 0 | 0 |
| Number of scars on fiber cores 11 | 0 | 0 | 0 | 0 | 0 |

Figure 5B:
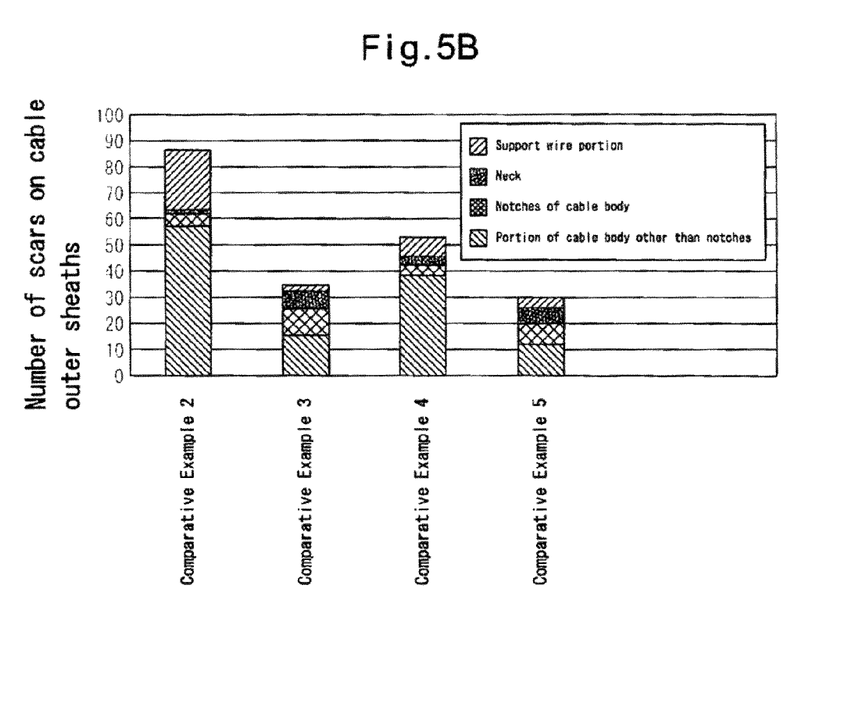

The same "roller screen test" as described above was conducted during the period mentioned above for Comparative Examples 2 to 5, of which the notches 14 were positioned according to the teachings of the above described JP Patent Publications 2002-090593A and 2002-328276A, and of which the outer sheaths 15 and 16 were made of flame-retardant polyethylene. Table 9 shows the results of this test, and FIG. 5(b) shows the breakdown of the scars on the outer sheaths 15 and 16 of Comparative Examples 2 to 5 caused by ovipositors b of black cicadas A. From these results, it is apparent that the outer sheaths 15 and 16 made of flame-retardant polyethylene are severely scarred.

TABLE 9

|  |  | Comparative example 2 | Comparative example 3 | Comparative example 4 | Comparative example 5 |
|---|---|---|---|---|---|
| Number of specimens |  | 16 | 16 | 16 | 16 |
| Number of holes (number of specimens) | Outer sheath of suspension wire | 22 | 2 | 7 | 3 |
|  | Neck (bridge) | 2 | 7 | 5 | 7 |
|  | Notches of cable body | 5 | 10 | 2 | 7 |
|  | Outer sheath other than notches on cable body | 58 | 16 | 39 | 13 |
|  | Total | 87 | 35 | 53 | 30 |
| Number of scars on fiber cores |  | 2 | 4 | 0 | 4 |

Cable specimens about 35 cm long according to Examples of the invention and Comparative Examples were placed in a breeding case 18 mm wide, 36 cm long and 25 cm high, together with four to five black cicadas, and their egg-laying behavior was observed. The results of observation are shown in Table 10.

From the observation results and Table 10, while some black cicadas determined whether or not a selected cable was suitable as a place for laying eggs based on feel to hair sensilla at their belly and with their snout, others did not or could not, and stuck their ovipositors. As a result, the cables according to examples of the invention also suffered shallow scars on the outer sheaths. On the other hand, the cables according to comparative examples suffered a larger number of deep scars on the outer sheaths, and also suffered scars on the optical fiber cores.

The polyurethane used in examples of the invention is not so hard as to be rigid, and resistant to abrasion and carving (abrasion resistance), though a sharp cutting edge can cut into it. Thus, although such polyurethane suffers shallow scars when the sharp portions of ovipositors are stuck, their serration-shaped portions cannot cut into such polyurethane and are simply rebounded. Thus, ovipositors cannot be stuck deep into such polyurethane. This is presumably because the sharp portion of an ovipositor at its tip is used only to initially form a shallow scar, thereby fixing, the ovipositor in position, and then parts of the ovipositor on both sides are used to carve the outer sheaths.

In Table 10, "Initial articles" refer to cable specimens that had been left to stand at normal temperature, "100° C.×30 days" refer to cable specimens that had been immersed in hot water of 100° C. for 30 days, "60° C.×30 days" refer to cable specimens that had been immersed in hot water of 60° C. for 30 days. These conditions correspond to accelerated aging tests. From these accelerated test results, it is apparent that the cable specimens according to examples of the invention can be reliably used for a long period of time.

TABLE 10

|  |  | Number of speciment | Accumulated number of times ovipositors were stuck | Accumulated time during which ovipositors were stuck | Number of scars found on outer sheath | Number of scars found on fiber |
|---|---|---|---|---|---|---|
| Embodiment | Initial material | 20 | 14 | 87 min. | 8 | 0 |
|  | 100° C. × 30 days | 8 | 6 | 22 min. | 4 | 0 |
|  | 60° C. warm water × 30 days | 8 | 9 | 18 min. | 4 | 0 |
| Comparative example | Initial material | 20 | 23 | 253 min. | 17 ※ Eggs found at 2 locations | 4 |

The above examples all have the support wire 13. But needless to say, by using the resin according to the present invention for the outer sheath 15 of a drop cable having no support wire 13, too, desired advantages are achievable. Also, one of the tension members 12 on both sides of the optical fiber cores 11 may be omitted, or conversely, more than two tension members 12 may be used.

The composition of the resin forming the outer sheaths 15 and 16 is not limited to that shown above. For example, this resin may be a flame-retardant low-friction polyurethane comprising 50 to 70% by weight of an ordinary polyether-based thermoplastic polyurethane elastomer, 20 to 40% by weight of an olefin resin as a polymer blend resin, and 5 to 10% by weight of a flame retardant. Also, this resin is not limited to a polyurethane but may be any other resin provided it has such high rebound resilience and/or abrasion that this resin is never or less likely to get stuck with ovipositors of cicadas such as black cicadas.

The two optical fiber cores 11 may be replaced by a twisted multiple-core fiber, a 4-core tape-shaped fiber, an 8-core tape-shaped fiber, or a laminate of a plurality of tape-shaped fibers.

Further, the cable may be of a solid structure having no gap G between the outer sheath 15 and the optical fiber cores 11.

What is claimed is:

1. A cicada-resistant outdoor optical drop cable (10) comprising an optical fiber core (11), a tension-resistant member (12), and an outer sheath (15) made of a single material and covering said core (11) and said tension-resistant member (12),
   wherein said outer sheath (15) is made of a resin having one or both of such rebound resilience and abrasion resistance that ovipositors (b) of cicadas such as black cicadas cannot be stuck therein,
   wherein said resin comprises a thermoplastic elastomer, and
   wherein a lubricant is added to said thermoplastic elastomer to improve lubricity on the surface of said outer sheath.

2. The cicada-resistant optical drop cable of claim 1 wherein said rebound resilience is 30 to 80% under JIS K7311, and said abrasion resistance is not more than 0.25 mm after being rotated 1000 times while being abraded, and not more than 0.35 mm after being rotated 2000 times while being abraded, under JIS C3005.

3. The cicada-resistant optical drop cable of claim 1 wherein said resin has a rebound resilience of 30 to 80% under JIS K7311, and an abrasion resistance of not more than 0.25 mm after being rotated 1000 times while being abraded, and not more than 0.35 mm after being rotated 2000 times while being abraded, under JIS C3005.

4. The cicada-resistant optical drop cable of claim 1 wherein said thermoplastic elastomer has urethane bonds in a hard segment of its molecular structure.

5. The cicada-resistant optical drop cable of claim 1 wherein said thermoplastic elastomer has ether bonds in a soft segment of its molecular structure and wherein an ultraviolet absorber is added thereto.

6. The cicada-resistant optical drop cable of claim 1 wherein a polyolefin resin is blended into said thermoplastic elastomer to improve extrusion properties.

7. The cicada-resistant optical drop cable of claim 4 wherein said thermoplastic elastomer has ether bonds in a soft segment of its molecular structure and wherein an ultraviolet absorber is added thereto.

8. The cicada-resistant optical drop cable of claim 4 wherein a polyolefin resin is blended into said thermoplastic elastomer to improve extrusion properties.

9. The cicada-resistant optical drop cable of claim 5 wherein a polyolefin resin is blended into said thermoplastic elastomer to improve extrusion properties.

* * * * *